Oct. 17, 1961    H. K. LICHTENWALNER    3,004,859
PROCESS FOR TREATING FILLERS
Filed May 28, 1958
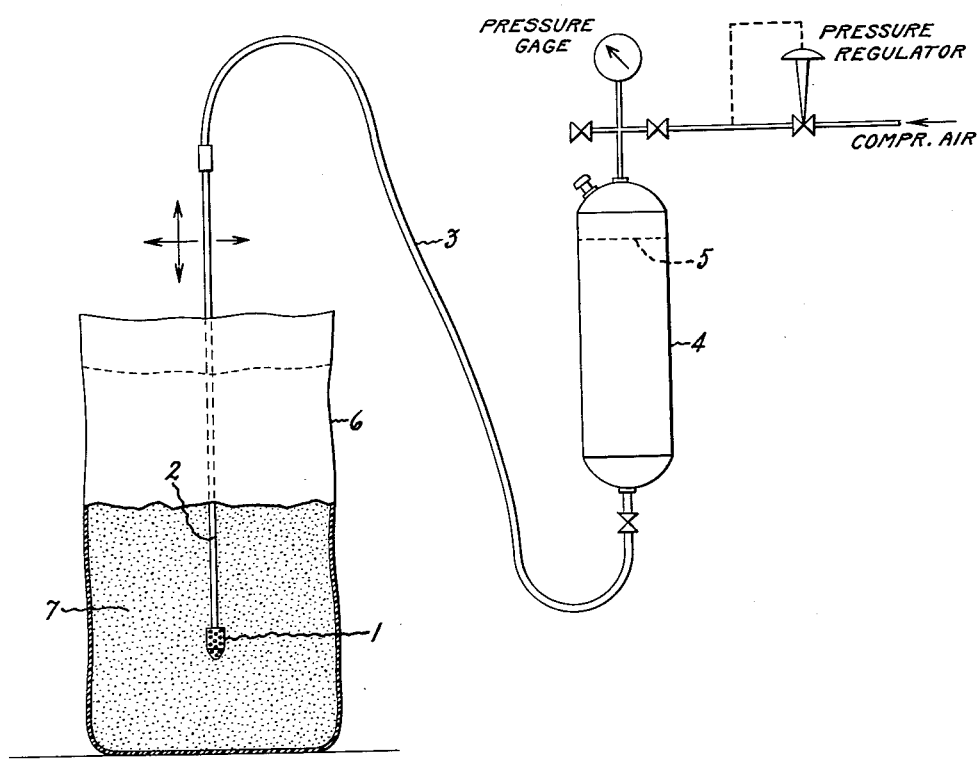
Inventor:
Hart K. Lichtenwalner,
by Joseph T. Cohen
His Attorney.

United States Patent Office 3,004,859
Patented Oct. 17, 1961

3,004,859
PROCESS FOR TREATING FILLERS
Hart K. Lichtenwalner, Rexford, N.Y., assignor to General Electric Company, a corporation of New York
Filed May 28, 1958, Ser. No. 738,438
7 Claims. (Cl. 106—308)

This invention is concerned with a process for treating fillers. More particularly, the invention relates to a process for treating finely divided inorganic metallic oxide fillers which cause structure in organopolysiloxanes convertible to the cured, solid, elastic state, which process comprises introducing a volatile lower alkylpolysiloxane (which includes mixtures of alkylpolysiloxanes) into a bulk mass comprising a finely divided, reinforcing, normally structure-forming inorganic metallic oxide filler, and thereafter allowing the filler and alkylpolysiloxane to remain in contact with each other for a time sufficient to effect intimate dispersion of the alkylpolysiloxane through the particles of the filler due to the volatility of the alkylpolysiloxanes.

When organopolysiloxanes convertible (for instance, by heat, in the presence of a curing agent or by irradiation with high energy electrons) to the cured, solid, elastic state are mixed with certain reinforcing fillers, especially certain finely dicided silicas such as silica aerogel, fume silicas, precipitated silicas, etc. (many examples of such finely divided fillers are described in Warrick U.S. Patent 2,541,137 and in French Patents 1,090,566 and 1,025,-837), it will be found that on standing even for short periods of time, for instance, even as little as one day, the compounded material becomes tough and nervy. This toughness and nerve of the filled, curable organopolysiloxane, which is also known as "structure," are recognized by the presence of an undesirable snap and difficulty in rendering plastic the rubber compound by usual mechanical working. These undesirable characteristics may occur even while these particular types of fillers are being added on suitable compounding equipment to the aforementioned convertible organopolysiloxane.

After incorporation of these structure-inducing fillers in the convertible organopolysiloxane, it will also be found that after the filled compound is stored for any length of time, for instance, from about two days to several months, this toughness and nerve increase to such a point that excessive milling times are required to form a plastic continuous film around the faster roll of a two-roll differential mill (whose rolls are operating at different speeds) normally used for rendering the stored compound plastic prior to further processing of the latter such as for purposes of incorporating other fillers and additives, for instance, curing agents, compression set additives, etc., or for "freshening" the filled compound so as to give better flow in subsequent molding, calendering, or extrusion operations.

This inability to obtain a plastic film in a short period of time is due to the fact that the compound on the rolls will not knit readily within a reasonable period of time; in some instances the curable, filled compound will not knit at all even after long periods of milling and it is often impossible to attain a satisfactory plastic (i.e., soft, pressure-flowable) condition with the result that the latter condition requires discarding the filled compound with obvious economic losses. The terms "knit" or "knitting" referred to in the present description are intended to mean the ready fusing of the laps and folds of a vulcanizable silicone rubber stock to form a continuous, homogeneous, textured sheet during milling. A more complete definition of this knitting property is found disclosed in the book, The Vanderbilt 1948 Rubber Handbook, page 79, ninth edition, published in 1948 by the R. T. Vanderbilt Company, 230 Park Avenue, New York, N.Y. The term "knit time" is intended to mean the time required to give this homogeneous, fused sheet.

A commercially successful method heretofore employed for overcoming the structure-forming characteristics of the above-described silica fillers is found disclosed and claimed in the copending application of Glennard R. Lucas, Serial No. 577,450, now Patent 2,938,009, filed April 11, 1956, and assigned to the same assignee as the present invention. In accordance with the disclosures in the above Lucas application, the structure tendencies of certain reinforcing fillers and the knit times within which a plastic, continuous sheet can be obtained on the rolls are materially reduced by treating the said fillers with a cyclic dialkylpolysiloxane of the formula $(R_2SiO)_n$, where R is a monovalent hydrocarbon radical selected from the class consisting of methyl and ethyl groups and $n$ is an integer equal to from 3 to 9, inclusive, for instance, $[(CH_3)_2SiO]_n$, where $n$ has the meaning given above. In accordance with the above Lucas application, the treatment of the filler is carried out by mixing the filler with the cyclic alkylpolysiloxane in a jacketed closed kettle in amounts ranging from about 5 to 50% (generally from 15 to 20%), by weight, of the cyclic polysiloxane based on the weight of the filler being treated. After effecting intimate dispersion of the filler in the cyclic polysiloxane (which is preferably a volatile liquid), the mixture is heated at temperatures of 100–350° C. for from 1 to 4 hours within normal pressures or under subatmospheric pressures while stirring the mixture of ingredients to permit homogeneous dispersion of the polysiloxane throughout the filler mass. This heating, especially at reduced pressures, also serves to remove any excess polysiloxane.

The filler treatment has as its object the covering of silanol groups on the filler surface with polysiloxane which the silanol groups will strongly adsorb, or with which the silanols will react. This prevents subsequent interaction between filler silanols and the siloxane gum in silicone rubber, which leads to the formation of "structure" in the uncured compound.

However, there are several disadvantages which accompany the treatment of the finely divided filler according to the process described in the Lucas patent application. Because of the relatively low bulk density of the filler being treated and the poor heat transfer of the filler composition, the size of the batch which can be treated according to Lucas' disclosure is limited and the time of treatment quite long. The resulting low production capacity ties up expensive equipment for undesirably long periods of time and increases the direct labor charges per unit weight of product.

Unexpectedly, I have discovered an inexpensive means for treating fillers of the type described above and in so doing, it is possible to process large amounts of such fillers with a minimum of investment in labor and in equipment and also to realize essentially a zero material loss. In accordance with my process a lower alkylpolysiloxane used to treat such fillers is mechanically injected or introduced in a suitable manner into the filler undergoing treatment and thereafter the treated filler is kept confined in an air-tight closed atmosphere for a sufficient length of time to allow the alkylpolysiloxane to disperse (by volatilization) throughout the filler bulk. After a sufficient time has elapsed which usually only requires storing the fillers, for instance, in bags or drums or in other large closed containers for from about four days to six weeks or more at normal temperatures (about 25 to 35° C.), it will be found that the treated filler is equivalent in essentially all respects to fillers treated, for instance, in the manner described in the Lucas application employing expensive equipment of low productive capacity, elevated temperatures, and relatively large amounts of labor.

The mechanism whereby the above-described invention operates is not clearly understood. It is, however, believed to be due to the volatility of the alkylpolysiloxane and the adsorptive characteristics of the finely divided inorganic metallic oxide being treated. For instance, octamethylcyclotetrasiloxane has a vapor pressure of about 1 mm. Hg at temperatures of about 27° C. Yet, despite this apparent low volatility, this polysiloxane, when mixed in accordance with the present invention, with a finely divided silica filler (e.g., fume silica) and allowed to remain in sealed contact with the particles of the filler, has sufficient volatility and the silica particles exert a sufficient adsorptive attraction for the volatilized octamethylcyclotetrasiloxane to effect intimate and homogeneous dispersion of the latter on the silica filler.

Initially, when the octamethylcyclotetrasiloxane and the silica filler are confined in the closed atmosphere, there exists an unstable system comprising the volatilized polysiloxane and the particles of silica. It is believed that the invention proceeds by means of a three-step operation, namely, first the octamethylcyclotetrasiloxane volatilizes, second the vapors diffuse into the region of the untreated silica surface, and third, the vapors are strongly adsorbed by the silica surfaces thereby effectively reducing the vapor pressure of the polysiloxane and causing more of the polysiloxane to volatilize. These additional quantities of octamethylcyclotetrasiloxane are then made available for distribution over the other untreated, that is uncoated, particles of silica filler. This process continues until a uniform coating of the polysiloxane has been distributed over all the particles of silica in the confined area.

The lower alkylpolysiloxanes used to treat the filler preferably are those which have a sufficient volatility to permeate readily throughout the mass of filler undergoing treatment. Included among such lower alkylpolysiloxanes (the word "lower" is intended to include alkyl groups containing from 1 to 2 carbon atoms) are, for instance, hexamethylcyclotrisiloxane, octamethylcyclotetrasiloxane, methylhydrogenpolysiloxanes having the formula $$[CH_3SiOH]_p$$

where $p$ has a value equal to from 3 to 5, inclusive, hexamethyldisiloxane, octamethyltrisiloxane, decamethyltetrasiloxane, hexaethyltrisiloxane, octaethyltetrasiloxane, trimethyltriethylcyclotrisiloxane, etc. and mixtures thereof. Included in the term alkylpolysiloxane are those which also have silicon-bonded alkenyl radicals, for instance, polysiloxanes of the formula  where $q$ is equal to from 3 to 4, inclusive. Mixtures of linear or cyclic lower polysiloxanes can also be used and thus one can employ mixtures of methylpolysiloxanes of the formula

where $r$=whole number from 0 to 10. Advantageously, these polysiloxanes have boiling points at 760 mm. of below 250° C. and preferably have vapor pressures of at least 0.1 mm. Hg at about 27° C.

The finely divided reinforcing fillers which have caused the above-described structure build-up and undesirable length of time for knitting of the convertible organopolysiloxane are usually finely divided silica fillers which may have free hydroxyl groups either in the form of adsorbed moisture or as silicon-bonded hydroxyl groups, depending on the method by which they are prepared. Under some conditions of manufacture, these structure-inducing fillers which originally contained hydroxyl groups, for instance, hydroxyl groups bonded directly to silicon of the silica molecule, no longer contain hydroxyl groups due to modification of such silicas, for instance, by the introduction of silicon-bonded alkoxy groups in place of some of the silicon-bonded hydroxyl groups. Such silicas cause increased structure and knit times when these silica fillers are incorporated in convertible organopolysiloxanes. These silica fillers are reinforcing fillers in contrast to other fillers of the non-reinforcing and usually non-structure-forming type, such as titanium dioxide, lithopone, calcium carbonate, etc. Examples of such structure-causing silica fillers may be found described in U.S. Patents 2,541,137; 2,610,167 and 2,657,149, as well as French Patents 1,025,837 (issued 1953) and 1,090,566 (issued 1955). Such structure-causing fillers may be slightly acidic or alkaline (i.e. have pH's slightly below or about 7) depending upon the method of manufacture, and may be obtained through an aerosol-aerogel process, by fuming processes such as by the vapor phase burning of silicon tetrachloride or ethyl silicate, by precipitation means, etc.

Another finely divided reinforcing filler which has been employed with convertible organopolysiloxanes but which also imparts undesirable structure to the convertible organopolysiloxane is a finely divided gamma alumina of average particle size less than 100 millimicrons. Such a filler and its use in combination with convertible organopolysiloxanes are more particularly described and claimed in the patent of Richard M. Savage, 2,671,069, issued March 2, 1954, and assigned to the same assignee as the present invention.

The manner whereby the filler may be treated with the lower alkylpolysiloxane (hereinafter for brevity referred to as "polysiloxane"), is relatively simple. Most of the above fillers received from the filler manufacturer come in large bags of about 2 to 6 cubic feet in volume. These fillers are relatively light and bulky and can be readily handled in large volume. It is only necessary to insert into the filler in the bag several small diameter tubes connected to a source (preferably a common source) of supply of the treating polysiloxane. These tubes may have a multiplicity of small diameter orifices (about 0.01 to 0.1" in diameter) distributed over the tube surface through which the treating agent can be sprayed into various areas of the filler bulk.

Another method comprises using a single spray head at the bottom of each tube whereby the tube is introduced into the bottom of the filler mass and the tube withdrawn slowly from the filler while simultaneously spraying the treating agent into the filler. The treatment is advantageously introduced into several places in the filler bulk thus adding to the ease of diffusion of the polysiloxane throughout the filler mass. The polysiloxane is preferably supplied by a constant pressure direct displacement feature (e.g., air or steam-operated piston type) delivering a predetermined constant volume of polysiloxane to each mass of filler. Thereafter the bag is merely sealed and stored at normal temperatures for times ranging from at least four days to allow the alkylpolysiloxane to diffuse throughout the filler. This period can obviously be extended to include usual storage periods for products of this type. However, the actual treatment and maximum effect is usually obtained within six weeks. The volatility of these alkylpolysiloxanes coupled with the unusual affinity of the polysiloxanes for the finely divided, structure-inducing fillers unexpectedly causes coating of the particles of fillers to a degree equivalent to that obtained using the prior discussed more expensive, mechanical blending and heating treatment disclosed in the aforesaid Lucas application.

The above-described arrangement relates to the treatment of fillers in bags. It will, of course, be apparent to those skilled in the art that the polysiloxane may be sprayed or applied at some point in the manufacturing cycle of the filler, allowing the diffusion process to proceed in the manufacturer's warehouse or while in transit. Thus, the manufacturer of the filler can mechanically mix the filler and the lower alkylpolysiloxane, tumble the mixture to disperse the polysiloxane, and then seal up the treated filler and store it (e.g., in large kettles, containers, bags, silos, bins, etc.) to allow a redistribution of the polysiloxanes on the filler surface to take place slowly by migration, diffusion, or desorption-resorption action.

The amount of polysiloxane used may be varied widely depending on the properties of the treated filler and the desired properties in the cured convertible organopolysiloxane in which the treated filler will be incorporated. Generally, I may employ from about 5 to 50%, by weight, of the polysiloxane based on the weight of the filler being treated. This percentage is equivalent to from 5 to 50 parts by weight of the polysiloxane per 100 parts of the filler being treated. The amount of polysiloxane used is preferably within the range of about 15 to 30%, by weight.

Thereafter the treated filler is incorporated in an organopolysiloxane convertible to the cured, solid, elastic state together with a curing agent such as benzoyl peroxide, bis-(2,4-dichlorobenzoyl) peroxide, tertiary butylperbenzoate, etc. These curing agents (or "vulcanization accelerators" as they are often designated) may be present in amounts ranging from about 0.1 to as high as 4 to 8 percent or more, by weight, based on the weight of the convertible organopolysiloxane. High energy electron irradiation without curing agents may also be employed for vulcanization purposes.

The amount of the treated structure-inducing filler used in combination with the convertible organopolysiloxane may obviously be varied within wide limits, for instance, from about 10 to 200 percent, by weight, of the filler based on the weight of the convertible organopolysiloxane. The exact amount of filler used will depend upon such factors as, for instance, the application for which the convertible organopolysiloxane is intended, the type of filler employed (e.g., density of the filler), the type of convertible organopolysiloxane employed, etc. The structure difficulty and excessive knit times are particularly troublesome when the above-described fillers comprise, by weight, from 0.2 to 0.8 part filler per part convertible organopolysiloxane. Obviously, mixtures of these reinforcing fillers, either alone or in combination with non-reinforcing fillers wherein the reinforcing filler comprises a sufficient amount, usually a majority of the weight of the fillers, to cause the undesirable structure build-up and increased knit time, may also be employed. Examples of other fillers (these may also be treated as described above) which may be incorporated in combination with the treated structure-inducing fillers may be, for instance, titanium dioxide, lithopone, zinc oxide, zirconium silicate, iron oxide, diatomaceous earth, finely divided sand, calcium carbonate, etc. If desired, these fillers may be treated with liquid organopolysiloxanes to improve the ease of dispersibility in the convertible organopolysiloxane.

The term "convertible organopolysiloxane" is intended to mean organopolysiloxanes which are viscous masses or gummy solids capable of conversion in the presence of curing agents or by high energy electrons to the cured, vulcanized state. These convertible organopolysiloxanes usually contain from 1.98 to 2.1 organic groups per silicon atom, the organic groups preferably being selected from the class consisting of monovalent hydrocarbon radicals, hydrogenated aryl radicals, and phenylalkyl radicals. Many examples of convertible organopolysiloxanes are found disclosed in the above-mentioned Lucas application and additionally in Savage Patent 2,671,069, issued March 2, 1954, and assigned to the same assignee as the present invention.

In order that those skilled in the art might better understand how the present invention may be practiced, the following examples are given by way of illustration and not by way of limitation. All parts are by weight.

The treatment of the finely divided silicas in accordance with the present invention and used as illustrating the practice of the present invention in the following examples, was carried out by opening a bag of filler (about 3 cubic feet in volume) at the top and injecting the particular alkylpolysiloxane used by means of a single-fluid spray nozzle attached to a wand of copper tubing. The treating agent was supplied to the nozzle from a pressurized tank connected to the wand by a flexible hose; the wand was inserted in the filler mass at a point near the bottom of the bag and withdrawn slowly while continuing to inject the alkylpolysiloxane. The procedure was repeated at a number of positions in the bag until the required amount of treating agent had been added.

The accompanying single figure shows a specific embodiment of the invention as employed in the following examples. In the figure, a spray nozzle 1 at the end of a copper wand 2 is connected by flexible tube 3 to a feed tank 4. The treating agent 5 under pressure in the feed tank is inserted into a bag 6 containing the finely divided silica filler 7. The arrows indicate that the wand can be moved in all directions in the filler mass.

As a control to show the attainment of the same results by means of the claimed invention as are obtained treating fillers in accordance with the kettle process described in the above-identified Lucas application, the silica filler was charged to a jacketed, closed kettle with a sufficient quantity of polysiloxane, in this instance, octamethylcyclotetrasiloxane within the range of about 15 to 20 percent of the latter based on the weight of the filler. The mixture was then heated in the closed kettle to a temperature above the boiling point (175° C.) of the octamethylcyclotetrasiloxane (about 250° C.) for about 4 hours while continuously stirring the mixture of the filler and the aforesaid methylpolysiloxane.

The fume silica used was obtained by burning silicon tetrachloride in the vapor phase to give a finely divided silica; this material is sold as "Aerosil"; another such filler is sold as "Cab-O-Sil." The precipitated silica used was HiSil–X–303 and again is a reinforcing finely divided silica filler of average particle size of about 0.025 micron.

In the following examples, the convertible organopolysiloxane used was a methyl vinylpolysiloxane convertible to the cured, solid, elastic state obtained by copolymerizing octamethylcyclotetrasiloxane with a small molar concentration of tetramethyltetravinylcyclotetrasiloxane with catalytic amounts of KOH at temperatures of 150 to 160° C. for about 4 to 6 hours. The viscous convertible organopolysiloxane thus obtained will hereinafter be referred to as "convertible methylpolysiloxane."

The knit time test employed in the following examples was conducted as follows: A two-roll differential laboratory mill, 3" x 8", was employed in which the speed ratio was 1.4 to 1 and the faster roll revolved at a speed of about 60 revolutions per minute. The mill roll clearance was adjusted to pass a 12 mil thick soft solder slug at a temperature of around 70° to 90° F. In conducting the test for knit time, 30 grams of the compound under test were added to the nip of the roll in small pieces to permit passage therethrough. A preliminary pass often was required at somewhat slightly wider setting to reduce the sample thickness. When all of the compound had passed through the nip once, a stop watch was triggered and the timing begun. The compound was added to the nip again and in order to keep the "bank" of compound in motion, it was sometimes necessary to open the mill slightly for a brief interval and then return to the predetermined 12-mil adjustment. The timing was continued until the compound became plastic and completely covered the width of the faster roll in the form of a continuous solid film. As soon as this happened, the timing was stopped and this elapsed time was recorded as "knit time."

In the following examples several silicone rubber formulations were used. These were as follows:

FORMULATION A

| Ingredient: | Parts |
|---|---|
| Convertible methylpolysiloxane | 100 |
| Fume silica (treated or untreated) | 70 |
| Diphenylsilanediol (structure-additive in the form of a 50 weight percent mixture with a methylpolysiloxane gum) | 4 |
| TiO₂ | 0.9 |
| Bis-(2,4-dichlorobenzoyl) peroxide (in the form of a 50 weight percent mixture with a methylpolysiloxane fluid) | 1.23 |

FORMULATION B

| Ingredient: | Parts |
|---|---|
| Convertible methylpolysiloxane | 100 |
| Fume silica (treated or untreated) | 70 |
| Diphenylsilanediol (structure-additive in the form of a 50 weight percent mixture with a methylpolysiloxane gum) | 4 |
| TiO₂ | 0.9 |
| Bis-(2,4-dichlorobenzoyl) peroxide (in the form of a 50 weight percent mixture with a methylpolysiloxane fluid) | 0.8 |

FORMULATION C

| Ingredient: | Parts |
|---|---|
| Convertible methylpolysiloxane | 100 |
| Precipitated silica | 50 |
| Bis-(2,4-dichlorobenzoyl) peroxide (in the form of a 50 weight percent mixture with a methylpolysiloxane fluid) | 0.75 |

Prior to determination of the physical properties such as tensile strength, elongation and tear strength of the cured samples, the formulations were molded in the form of flat sheets at a temperature of about 150° C. for 15 minutes under a pressure of about 500 p.s.i., and thereafter heat-aged in an air-circulating oven for a time and at a temperature stipulated in the following examples.

In the tables in the following examples, reference to the age of the filler when compounded means the length of time the polysiloxane treating agent was allowed to remain sealed up with the filler prior to incorporation in the silicone gum.

Example 1

In this example, three different types of rubber formulations were prepared employing the proportion of ingredients recited in Formulation A above. In each of the formulations the fume silica employed was "Aerosil" sold by De Gussa Company. In one sample (No. 1) the formulation was a control using a fume silica which received no treatment at all. In a second sample (No. 2), the formulation used a fume silica which was treated with octamethylcyclotetrasiloxane in a bag in the manner described above, the closed bag containing the treated filler being allowed to remain for 20 days after introduction of the polysiloxane. In a third sample (No. 3) the fume silica was treated with octamethylcyclotetrasiloxane in a kettle in the manner described above and more particularly disclosed in the above-identified Lucas application, Serial No. 577,450. Each of the sample compositions was molded in the manner recited above and thereafter the physical properties of the molded samples after heat aging were determined. The following Table I shows the parts of treating agent used per 100 parts of fume silica filler, the physical properties of the molded samples, and the knit times of the filled moldable compositions. The knit time was carried out on the moldable mixture of ingredients after standing at room temperature (about 25–27° C.) for the time stipulated in Table I.

TABLE I

| | Sample number | | |
|---|---|---|---|
| | 1 | 2 | 3 |
| Parts treating agent/100 parts filler | None | 20 | 17 |
| Physical Properties: | | | |
| 1 hr./150° C.: | | | |
| Tensile, p.s.i | 1,010 | 1,300 | 1,250 |
| Elongation, percent | 240 | 420 | 440 |
| Tear, lbs./inch | 100 | 108 | 119 |
| 24 hrs./150° C.: | | | |
| Tensile, p.s.i | 940 | 1,190 | 1,330 |
| Elongation, percent | 220 | 340 | 410 |
| Tear, lbs./inch | 87 | 98 | 114 |
| 24 hrs./250° C.: | | | |
| Tensile, p.s.i | 820 | 840 | 940 |
| Elongation, percent | 200 | 250 | 240 |
| Tear, lbs./inch | 82 | 76 | 94 |
| Knit time, sec., after— | | | |
| 3 days | | 40 | 18 |
| 7 days | 89 | | |
| 14 days | 152 | 60 | 67 |
| 28 days | 172 | 89 | 74 |

Example 2

In this example Formulation A was used as the base for making moldable compositions employing the same treatment, the same fume silica and the same treating agent for the filler, namely, octamethylcyclotetrasiloxane as in Example 1. With the exception of the control sample (sample No. 4) each of the other tests used varying amounts of octamethylcyclotetrasiloxane as the treating agent for the fume silica. After treatment with the treating agent, the fillers were allowed to remain sealed up in contact with the polysiloxane for varying lengths of time. The following Table II shows the concentration of octamethylcyclotetrasiloxane used in each instance, the time within which the treating agent remained in contact with the filler in the enclosed bag, physical properties of the molded, heat-aged samples, and the knit times of the moldable compositions. Sample No. 4 in Table II used no treated filler at all.

TABLE II

| | Sample number | | | | |
|---|---|---|---|---|---|
| | 4 | 5 | 6 | 7 | 8 |
| Parts treating agent/100 parts filler | 0 | 5 | 10 | 15 | 20 |
| Age of filler when compounded, days | | 16 | 16 | 15 | 29 |
| Physical Properties: | | | | | |
| 1 hr./150° C.: | | | | | |
| Tensile, p.s.i | 1,260 | 1,320 | 1,100 | 1,210 | 1,290 |
| Elongation, percent | 290 | 400 | 420 | 490 | 450 |
| Tear, lbs./inch | 81 | 120 | 126 | 107 | 191 |
| 24 hrs./150° C.: | | | | | |
| Tensile, p.s.i | 910 | 1,070 | 1,290 | 1,140 | 1,310 |
| Elongation, percent | 200 | 300 | 400 | 400 | 380 |
| Tear, lbs./inch | 78 | 109 | 109 | 111 | 138 |
| 24 hrs./250° C.: | | | | | |
| Tensile, p.s.i | 740 | 690 | 850 | 700 | 1,000 |
| Elongation, percent | 180 | 230 | 310 | 260 | 290 |
| Tear, lbs./inch | 87 | 69 | 78 | 97 | 90 |
| Knit time, sec., after— | | | | | |
| 3 days | 99 | 67 | 43 | 23 | 19 |
| 14 days | 118 | 69 | 61 | 62 | 70 |
| 28 days | 131 | 98 | 82 | 78 | 79 |

Example 3

This example illustrates the effect of using as a treating agent not only octamethylcyclotetrasiloxane (identified as "D₄") but other lower alkylpolysiloxanes specifically hexamethyldisiloxane (identified as "HMDS") and hexamethylcyclotrisiloxane (identified as "D₃"). The filler used was the same fume silica described in Example 1, the formulation was Formulation A, and the treatment of the fume silica with the various treating agents was carried out in the same manner in a bag as described in Example 1. In each instance 20 parts of treating agent were used per 100 parts of the filler. The following Table III shows the type of treating agent used, the time within which the treating agent was allowed to remain in contact with the filler in the closed bag as well as the physical properties of the molded samples and the knit times of the moldable compositions.

TABLE III

|  | Sample number | | | |
|---|---|---|---|---|
|  | 9 | 10 | 11 | 12 |
| Treating agent | D₄ | HMDS | HMDS | D₃ |
| Age of filler when compounded, days | 20 | 14 | 35 | 18 |
| Physical properties: | | | | |
| 1 hr./150° C.: | | | | |
| Tensile, p.s.i | 1,300 | 1,440 | 1,430 | 1,320 |
| Elongation, percent | 420 | 370 | 320 | 410 |
| Tear, lbs./inch | 108 | 148 | 114 | 185 |
| 24 hrs./150° C.: | | | | |
| Tensile, p.s.i | 1,190 | 1,330 | 1,250 | 1,310 |
| Elongation, percent | 340 | 310 | 290 | 380 |
| Tear, lbs./inch | 98 | 114 | 109 | 132 |
| 24 hrs./250° C.: | | | | |
| Tensile, p.s.i | 840 | 830 | 790 | 990 |
| Elongation, percent | 250 | 190 | 170 | 260 |
| Tear, lbs./inch | 76 | 86 | 87 | 95 |
| Knit time, sec., after— | | | | |
| 3 days | 40 | 50 | 50 | 44 |
| 14 days | 60 | 107 | 85 | 59 |
| 28 days | 89 | 82 | (¹) | 91 |

¹ Not tested.

*Example 4*

In this example, Aerosil fume silica treated in one instance with octamethyltetrasiloxane in a bag (sample No. 14), and in another instance by kettle treatment (sample No. 13) as more particularly described above, was used in two tests employing Formulation B. The treatments in the bag and in the kettle were carried out in the same manner as described above, employing in each instance 20 parts of octamethylcyclotetrasiloxane as treating agent per 100 parts of filler. The following Table IV shows the results of these tests as far as the physical properties are concerned, the filler treated in the bag being kept in closed intimate contact for 29 days prior to its use in the formulation.

TABLE IV

|  | Sample number | |
|---|---|---|
|  | 13 | 14 |
| 1 hr./150° C.: | | |
| Tensile, p.s.i | 1,370 | 1,540 |
| Elongation, percent | 520 | 520 |
| Tear, lbs./inch | 209 | 201 |
| 24 hrs./250° C.: | | |
| Tensile, p.s.i | 840 | 900 |
| Elongation, percent | 190 | 240 |
| Tear, lbs./inch | 113 | 150 |
| 22 hrs./177° C. compression set, percent | 26 | 27 |

*Example 5*

In this example a finely divided silica, specifically precipitated silica, having an average particle size of about 0.025 micron, was treated in one instance by the bag treatment described above and in another instance by the kettle treatment also described previously, employing in each instance octamethylcyclotetrasiloxane as the treating agent. The formulation used in this instance was Formulation C.

The following Table V shows the amount of treating agent used in each instance; in the case of the bag treatment (sample No. 15), the filler and treating agent were allowed to remain in intimate contact with each other for 53 days. Table V reports physical properties of the sample after molding and the knit times of the moldable compositions. Sample No. 16 used a silica treated in a kettle in a manner similar to that described above. A control test (No. 17) showing the effect of using untreated precipitated silica is also included in Table V.

TABLE V

|  | Sample number | | |
|---|---|---|---|
|  | 15 | 16 | 17 |
| Parts treating agent/100 parts filler | 20 | 17 | 0 |
| Physical properties: | | | |
| 1 hr./150° C.: | | | |
| Tensile, p.s.i | 950 | 880 | 950 |
| Elongation, percent | 280 | 330 | 190 |
| Tear, lbs./inch | 81 | 69 | 63 |
| 24 hrs./250° C.: | | | |
| Tensile, p.s.i | 830 | 870 | 920 |
| Elongation, percent | 240 | 230 | 190 |
| Tear, lbs./inch | 58 | 42 | 66 |
| 96 hrs.¹/250° C.: | | | |
| Tensile, p.s.i | 970 | 760 | 840 |
| Elongation | 290 | 240 | 230 |
| Tear, lbs./inch | 59 | 49 | 41 |
| Knit time, sec., after— | | | |
| 3 days | 9 | 10 | 35 |
| 14 days | 35 | 28 | 84 |
| 28 days | 51 | 44 | 87 |

¹ Prior to molding, moldable compositions were shelf-aged for 28 days.

It is to be noted that after treatment of the fillers with the lower alkylpolysiloxanes, it will be found that the filler so produced is hydrophobic and remains so even after long heating at elevated temperatures. Thus, in the case of treatment of the filler with octamethylcyclotetrasiloxane, the treated filler can be heated for long periods of time at 250° C., well above the boiling point of the octamethylcyclotetrasiloxane, without any apparent change in the hydrophobicity of the filler.

What is particularly desirable in the treatment of the fillers herein described is the fact that the bulk density of the initial treated filler is essentially unchanged from the bulk density of the initial untreated filler. This is in direct contrast with the results that are usually obtained by treating the filler with some of the organo-silicon compositions described in the prior art. Thus, when one employs, for instance, trimethylchlorosilane which is a material often disclosed for the purpose of treating fillers, one finds that, in addition to having to cope with the evolution of hydrogen chloride released in the treatment, also the bulk density of the product is materially reduced and in some instances is less than half of the bulk of the original untreated finely divided filler.

Where desired, solvent and dispersing media such as toluene, xylene, butanol, etc. may be employed to make solutions and dispersions of the treated silica-silicone rubber combinations for coating and impregnating purposes. These coating compositions may be used to treat (e.g., coat and impregnate) various sheet materials such as glass cloth, asbestos cloth, mica sheets, various fibers, and finely divided fillers, such as mica, glass fibers, asbestos floats, etc. Such treated products may be heated at the requisite temperature to remove solvent or dispersing media (if coating compositions are involved), and thereafter further heat-treated at the elevated temperatures recited previously to convert the organopolysiloxane to the cured, solid, elastic state.

It will, of course, be apparent to those skilled in the art that amelioration of the undesirable effects of other structure-inducing fillers, as well as fillers which cause undesirably long knit times, is intended to be included within the scope of the present invention. Moreover, other convertible organopolysiloxanes, for instance, convertible ethylpolysiloxanes, as well as other lower alkyl polysiloxanes, may be employed in place of the convertible methylpolysiloxanes and alkyl polysiloxanes described in the foregoing examples. The proportions of ingredients may be varied widely as may the other conditions recited above without departing from the scope of the invention. The application involved, the convertible organopolysiloxane used, the filler employed, the lower alkyl polysiloxanes used, etc., will all contribute to the relationship between the ingredients as far as proportions and selection thereof are concerned. Obviously, other fillers which do not induce structure or which do not undesirably affect knit time such as, for instance, titanium dioxide, ferric oxide, calcium carbonate, etc., may be incorporated in combination with the structure-inducing fillers.

The compositions herein described having reduced structure and lower knit times can be advantageously employed in extrusion, molding, and calendering applications. Alternatively, these compositions can be dissolved and/or dispersed in suitable solvents or dispersing agents and used for coating and impregnating purposes for coating glass tape, glass fibers, glass fiber sheets, asbestos cloth, etc. In the latter instance, glass cloth can be coated with the convertible organopolysiloxanes herein described containing the treated filler and curing agent, and thereafter the coated glass cloth can be wrapped around mandrels to make heater ducts and cured under heat and pressure to give unitary structures having outstanding heat resistance. The significance of the reduction of structure lies in the ability to readily compound on rolls a filled silicone compound within commercially feasible times by mechanical action on suitable equipment after the compound has been stored for long periods of time, and thereafter to use it in any of the above-identified applications by normal fabricating techniques. Compounds prepared in the above manner can be readily extruded over electrical conductors and can be heat-treated at elevated temperatures in order to obtain a smooth, coherent, cured insulation having outstanding thermal stability.

What I claim as new and desire to secure by Letters Patent of the United States is:

1. The process which comprises mixing from 5 to 50 parts by weight of a volatile lower alkylpolysiloxane having a boiling point of less than 250° C. with 100 parts of a bulk mass consisting essentially of a finely divided inorganic metallic oxide filler and allowing the filler and alkylpolysiloxane to remain in intimate contact with each other in a sealed container for at least 4 days at a temperature of from about 25 to 35° C. until the alkylpolysiloxane is intimately dispersed through the said filler by volatilization of the alkylpolysiloxane.

2. The process as in claim 1 in which the filler is a finely divided silica.

3. The process which comprises injecting from 5 to 50 parts by weight of octamethylcyclotetrasiloxane into 100 parts of a bulk mass consisting essentially of a finely divided silica and allowing the silica and the octamethylcyclotetrasiloxane to remain in intimate contact with each other in a sealed container for at least 4 days at a temperature of from about 25 to 35° C. until the octamethylcyclotetrasiloxane is intimately dispersed by volatilization of the latter throughout the silica.

4. The process which comprises injecting from 5 to 50 parts by weight of hexamethyldisiloxane into 100 parts of a bulk mass consisting essentially of a finely divided silica and allowing the silica and the hexamethyldisiloxane to remain in intimate contact with each other in a sealed container for at least 4 days at a temperaure of from about 25 to 35° C. until the hexamethyldisiloxane is intimately dispersed by volatilization of the latter throughout the silica.

5. The process which comprises injecting from 5 to 50 parts by weight of hexamethylcyclotrisiloxane into 100 parts of a bulk mass consisting essentially of a finely divided silica and allowing the silica and the hexamethylcyclotrisiloxane to remain in intimate contact with each other in a sealed container for at least 4 days at a temperature of from about 25 to 35° C. until the hexamethylcyclotrisiloxane is intimately dispersed by volatilization of the latter throughout the silica.

6. The process which comprises spraying from 5 to 50 parts by weight of a volatile lower alkylpolysiloxane having a boiling point below 250° C. into several areas of a bulk mass consisting essentially of 100 parts of a finely divided, reinforcing silica filler and allowing the silica and the alkylpolysiloxane to remain sealed in a container for at least 4 days in intimate contact with each other at a temperature of from about 25 to 35° C. until the alkylpolysiloxane through volatilization of the latter becomes intimately dispersed through said silica filler.

7. The process which comprises mixing a volatile lower alkylpolysiloxane having a boiling point below 250° C. with a bulk mass consisting essentially of a finely divided filler selected from the class consisting of silica and alumina and allowing the filler and alkylpolysiloxane to remain in intimate contact with each other in a sealed container at a temperature of from about 25 to 35° C. for a period of from about four days to six weeks until the alkylpolysiloxane is intimately dispersed through said filler by volatilization of said alkylpolysiloxane, said alkylpolysiloxane being present in an amount equal to from about 5 to 50% by weight based on the weight of said filler.

References Cited in the file of this patent

UNITED STATES PATENTS

| | | |
|---|---|---|
| 2,424,853 | Safford | July 29, 1947 |
| 2,567,315 | Bidaud et al. | Sept. 11, 1951 |
| 2,615,006 | Lane | Oct. 21, 1952 |
| 2,645,588 | Barry | July 14, 1953 |
| 2,665,264 | Brooks et al. | Jan. 5, 1954 |
| 2,667,658 | Bidaud | May 4, 1954 |
| 2,793,198 | Blurstein | May 21, 1957 |
| 2,831,829 | Brooks et al. | Apr. 22, 1958 |
| 2,938,009 | Lucas | May 24, 1960 |

OTHER REFERENCES

Hackh's Chemical Dictionary, third edition, 1950, page 771.